Figure 7:
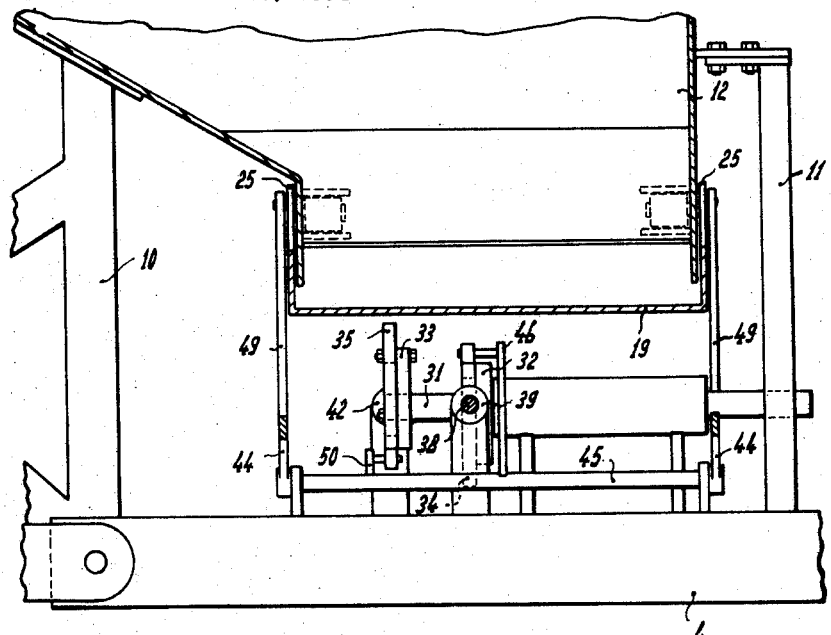

March 19, 1963  C. VAN DER LELY ETAL  3,082,008
VEHICULAR SPREADER DEVICE
Original Filed March 30, 1954  4 Sheets-Sheet 1
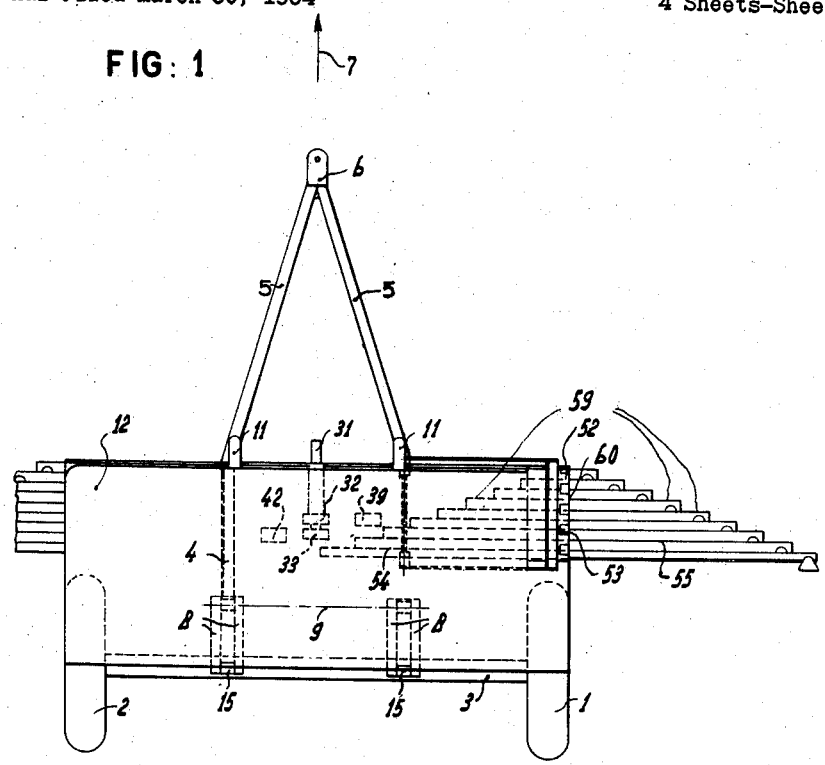
FIG: 1
FIG: 2

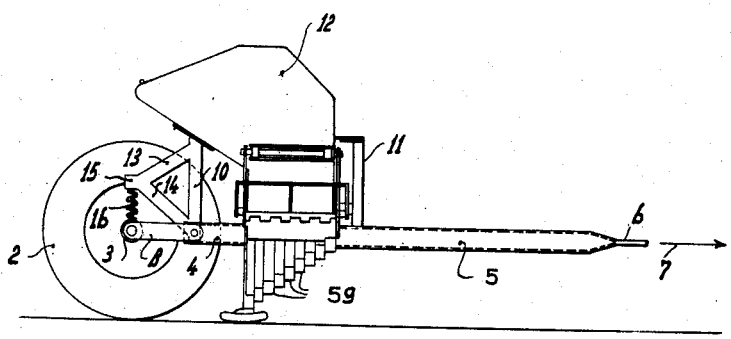

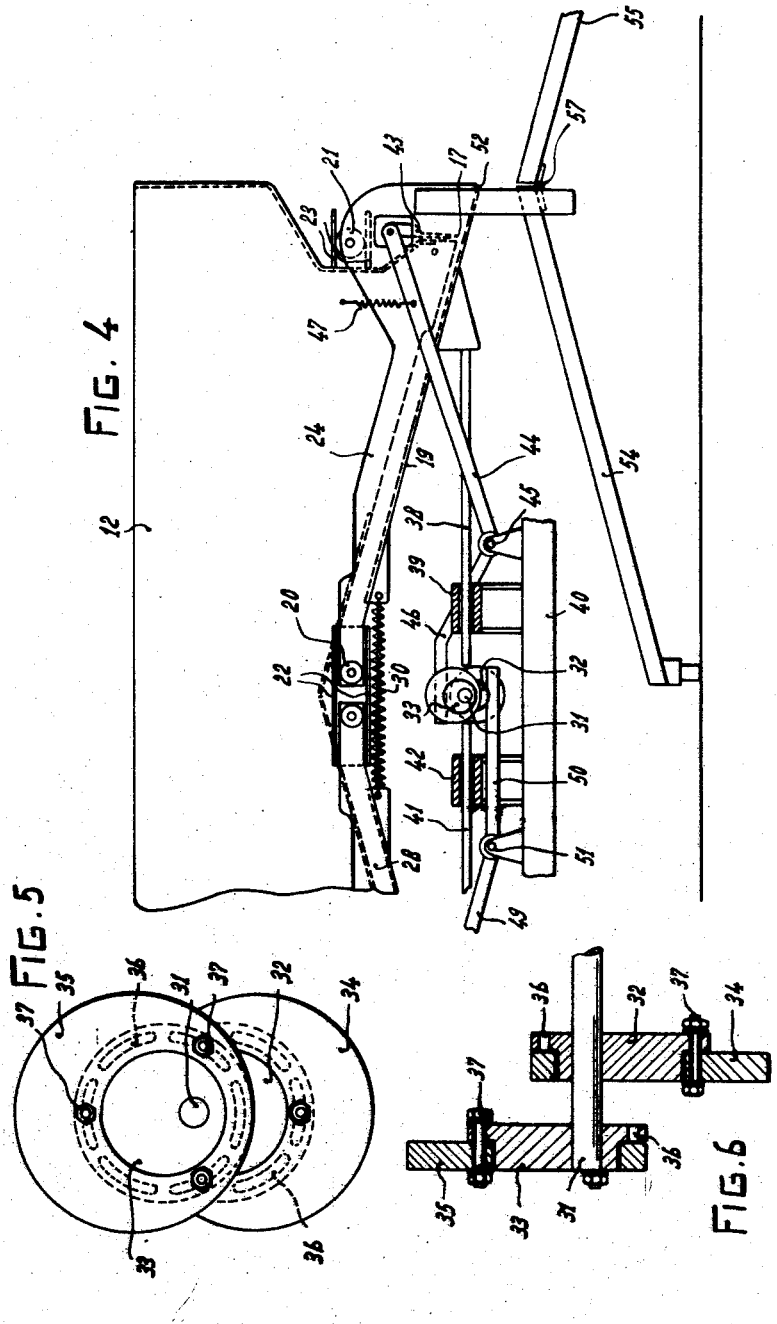

United States Patent Office  
3,082,008  
Patented Mar. 19, 1963

3,082,008  
VEHICULAR SPREADER DEVICE  
Cornelis van der Lely, Zug, Switzerland, and Ary van der Lely, Maasland, Netherlands, assignors to C. van der Lely N.V., Maasland, Netherlands, a Dutch limited company  
Original application Mar. 30, 1954, Ser. No. 419,825, now Patent No. 2,980,430 dated Apr. 18, 1961. Divided and this application Feb. 2, 1961, Ser. No. 86,614  
13 Claims. (Cl. 275—7)

This application is a division of our application filed March 30, 1954, Serial No. 419,825 (now Patent No. 2,980,430). This invention relates to vehicular devices for spreading strewable material over a striplike area of ground during ground traversing movement, said devices being of the type comprising a supporting frame and at least one container for the material to be strewn mounted on said frame and having at least one opening, at least two supporting members being operatively associated with said frame for the material to be strewn.

It is an object of the present invention to provide a device of the above indicated kind with which the material can be strewn in a favorable manner. In accordance with the invention this is attained by the fact that means are coupled to said supporting members whereby the latter are oscillated to cause the material discharged through the outlet opening of the container to move over said supporting members, said means comprising a shaking device coupled to and moving said members alternatively towards and away from each other whereby the oscillating motion of the supporting members will not swing the container so that the material can be discharged from the container in an effective way.

According to a further aspect, the invention relates to a vehicular device for spreading strewable material over a striplike area of the ground during ground traversing movement of the device, said device comprising a supporting frame and at least one container for the material to be strewn mounted on said frame, said container having an outlet opening beneath which is located a supporting member to which is coupled a shaking device oscillating said supporting member, said supporting member being located at least partly above a spreading device spreading the material over the striplike area whereby the material can be supplied from the container in an effective way to the spreading member which can evenly spread the material over the striplike area of the ground.

According to a further aspect, the invention relates to a vehicular device for spreading strewable material over a striplike area of the ground during ground traversing movement of the device, said device comprising a supporting frame and at least one container for the material to be strewn mounted on said frame and having at least two portions separated at least partly from each other and each having an outlet opening, a spreading device being provided beneath each of said outlet openings, said outlet openings being located on different sides of the longitudinal axis of the device at the outer sides of the container extending in a direction transversely of the travelling direction of the device whereby the material can be spread evenly over a wide striplike area, each of the spreading members spreading the material over half of the striplike area.

Figure 8:
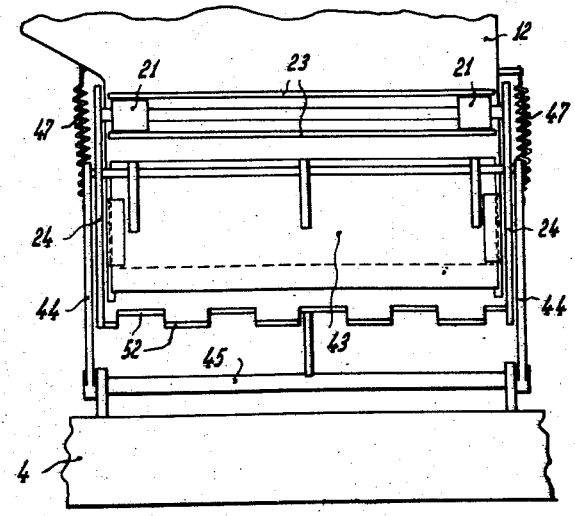

Further objects, features and details of the invention will appear from the following description of a preferred embodiment with reference to the accompanying drawings, in which:

FIG. 1 shows in plan view a device according to the invention,  
FIG. 2 shows in back elevation the device of FIG. 1,  
FIG. 3 shows in side elevation the device of FIG. 1,  
FIG. 4 is a portion of the structure of FIG. 2 on enlarged scale,  
FIG. 5 is a portion of the structure of FIG. 4 on enlarged scale,  
FIG. 6 is a sectional view of the structure of FIG. 5,  
FIG. 7 is a sectional view along a longitudinal plane in FIG. 1, and  
FIG. 8 is a side view of the structure of FIG. 4.

The device illustrated in the drawing is supported on running wheels 1 and 2 rotatably mounted on a horizontal tube 3. Said tube forms part of a supporting frame further comprising two parallel horizontal beams 4 and two horizontal beams 5 intersecting at a point 6. At said point 6, fastening means are provided to connect the device to a fixed point of a tractor (not shown), so that the device can be drawn forward with the aid of said tractor in the direction of the arrow 7.

The tube 3 carries arms 8 which are hingedly connected to the rear ends of the beams 4. The common hinge axis has been indicated by the reference numeral 9. On the rear ends of the beams 4 are fixed vertical bars 10 carrying, in conjunction with supporting bars 11 on the rear ends of the beams 5, a container 12 which can be filled from its upper end with the material to be spread over the ground. By means of bars 13 and 14, the bars 10 are connected to supports 15 for two vertical compression springs 16 which are located between said supports 15 and the tube 3. The length and rigidity of said springs are such that the arms 8 remain approximately in horizontal position.

The oblong container 12 extends transversely of the direction 7 and has outlet openings 17 and 18, respectively, at each end. These openings are located approximately directly in front of the wheels 1 and 2, the lower side of the container 12 being downwardly inclined from the center towards said openings.

The inclined lower side divides the container into a right hand part 26 and a left hand part 27. Under the inclined lower side of the right hand part and the corresponding outlet opening 17 is provided a supporting member 19 which can be moved to and fro in a horizontal direction at right angles to the direction 7 and which is guided during said movement by rollers 20 and 21 running in horizontal guides 22 and 23 fixed to the container 12. An upright edge 24 on the rear side of the supporting member 19 and an edge 25 of the same height on the front side thereof prevent strewable material from escaping along these sides.

Under the left half of the container 12 is provided a supporting member 28 which is the mirror image of the supporting member 19 and which is guided in the same manner by rollers in the guides 22 and in guides 29. The adjacent ends of the supporting members 19 and 28 are connected together by a draw spring 30, so that said surfaces always tend to move towards each other.

In order to put the supporting members 19 and 28 and some other movable parts of the device into reciprocating movement, a shaft 31 is provided which extends in the direction of travel and which is driven by the power take-off of the tractor, when the machine is drawn forward by said tractor over the field. The shaft 31 carries two eccentric disks 32 and 33 which are staggered with regard to each other by 180°. Disks 34 and 35 are mounted eccentrically on the disks 32 and 33, respectively, in a manner such as to permit angular displacement of the disks 34 and 35 with respect to the related disks 33 and 34. For example, as shown in FIG. 4, the disks 32 and 33 can have elongated arcuate slots 36 therein to receive bolts 37 which adjustably secure the disks 34 and 35 thereto.

To the supporting member or supporting surface 19 is connected one end of a horizontal rod 38 which is slidable to and fro in longitudinal direction in a guide 39 rigidly connected to a beam 40 of the frame and which bears against the disk 34 at least during part of each revolution of the shaft 31. In a similar manner a rod 41 with a guide 42 is connected to the supporting surface 28, said rod cooperating with the disk 35. Upon each revolution of the shaft 31 the supporting surfaces 19 and 28 are thus once separated from each other, after which the spring 30 forces both surfaces together again.

It will be evident that the supporting member 19 tends to convey material from the container along its upper face downwardly to the right. The quantity which can be displaced thereover per unit of time is controlled by a slide 43 which may be moved up and down by means of a lever system 44 rotatable on an axis 45. For this purpose to the lever system 45 is connected an arm 46, the free extremity of which is controlled by the upper side of the eccentric disk 34 (see FIG. 4). A spring 47 tends to keep the slide 43 in its open position. The slide is opened to a certain extent when the member 19 moves to the right and is kept closed by the disk 34 during the returning movement of the member 19.

The amplitude of the shaking motion of the supporting member 19 and the reciprocating motion of the slide 43 may be adjusted as required, e.g. by varying the eccentricity of the disk 34. The desired variation in the eccentricity of the disk 32 can be achieved by loosening the bolts 37 holding the disk 34 thereto, whereupon the disk 34 can be turned relative to the disk 32 by reason of slidable engagement of the loosened bolts 37 in the related slots 36.

A slide 48 is likewise adapted for cooperating with the supporting member 28. The operation of this slide is effected by a lever system 49 and by an arm 50 cooperating with the lower side of the eccentric disk 35 and rotatable on an axis 51 in such a manner that the supporting members 19 and 28 will discharge equal quantities of material from the container 12.

The upper edges of the slides 43 and 48 are located at an appreciably higher elevation than the adjacent edges of the outlet openings 17 and 18 of the container 12, so that there is no risk that any material might pass over the slides. The material moves under each slide in a layer of uniform thickness and then reaches the lower edge 52 of the supporting surface in question. These lower edges are provided with rectangular incisions 53, as has been shown for the member 19 in the right hand part of FIG. 1.

Under the edge 52 two oppositely inclined spreading members 54 and 55 meet each other in a horizontal edge 56 situated in the direction of travel. Near this edge said spreading members are hinged on an axis 57 parallel to said edge. The lower ends of the spreading members are each supported by a sliding piece 58, by which it is possible to arrange said spreading members as low as possible, so that the whole construction can be kept very low. The sliding pieces 58 also serve as marking means for making a visible track on the ground so that, during each successive pass over the field, the visible track previously made on the ground can serve as a guide for the driver to avoid repeated strewing of material on the same area or the failure to strew any material on an area.

The spreading members 54 and 55 are provided with gutters, the lower extremities 59 of which are equally distributed over the width of the striplike area of the ground that has to be strewn by means of said members, so that if an equal quantity of material is supplied to each gutter per unit of time, an equal distribution of the material over said area is assured. The equal supply of material to all gutters is obtained by the special form of the edge 52. From a portion 60 of the edge 52 the material falls uniformly into two adjacent gutters of the member 55, whereas from an incision 53 of said edge 52 the material is equally delivered to two adjacent gutters of the member 54. The edge portions 60 and the incisions 53 are further of equal width and will consequently deliver the same quantity of material. It will be understood that the edge portions 60 and the incisions 53, which in the illustrated embodiment are respectively located above the member 55 and above the member 54, may be also located in alignment, but in this case separate guiding means would be necessary to deliver the material passing over the edge portions 60 and 53 uniformly into two adjacent gutters respectively of the members 55 and 54. Such guiding means may be also provided as additional means in the embodiment shown. The members 54 and 55 are secured to the supporting member 19 so that the spreading members 54 and 55 take part in the reciprocating movement of the supporting member 19, by which a uniform movement of the material over said members will be assured.

In the same manner as the member 19 feeds the movable parts or members 54 and 55, the member 28 feeds two corresponding members 61 and 62 taking part in the horizontal movement of the member 28. The spreading members 61 and 62 may be easily swung upwards, in order to reduce the width of the device, when the same is out of operation and has to be transported or stored.

In certain cases it may be desirable to make a supporting member discharging material from the container underneath an edge steplike in form instead of planar, so that steeper portions corresponding to the rises are alternated by portions of lesser steepness corresponding to the treads of a stair. The edge under which the material passes should of course have the same direction as the longitudinal direction of the said portions. The steeper portions will assure delivery of the desired quantity, even if the material to be strewn is of greater consistency.

What we claim is:

1. A vehicular device for spreading strewable material over a striplike area of the ground during ground traversing movement of the device, said device comprising a supporting frame, at least one container for said material mounted on said frame, said container having at least one outlet opening, at least two supporting members adjacent said container to receive and support material, means mounting said supporting members on said frame for oscillating movement, and a shaking device coupled to said supporting members to oscillate the latter whereby material supplied to the supporting members through the outlet opening of the container is caused to move over said supporting members, said shaking device moving said supporting members alternatively towards and away from each other.

2. A device as defined in claim 1 wherein the supporting members are on opposite sides of the longitudinal axis of the device.

3. A device as defined in claim 1 wherein the shaking device moves said members alternatively towards and away from each other in a substantially horizontal direction transversely of the ground traversing movement of the device.

4. A device as defined in claim 1 wherein the supporting members form the bottom of the container.

5. A device as defined in claim 1 comprising and wherein the container is at least partly supported by the frame through the intermediary of springs.

6. A device as defined in claim 1 comprising a spreading member adjacent each supporting member and wherein each supporting member is located between the container and the corresponding spreading member spreading the material over the striplike area of the device, said supporting members moving the material to the spreading member.

7. A device as defined in claim 6 wherein the container is provided with two outlet openings, comprising spreading members on the frame, said spreading members and the outlet openings being located on different sides of the longitudinal axis of the device, the material being supplied to the spreading members by the supporting members adjacent the outer sides of the container.

8. A device as defined in claim 7 wherein the shaking device is coupled to the spreading members to cause the said spreading members to have an oscillating motion.

9. A device as defined in claim 8 wherein the shaking device moves said spreading members alternatively towards and away from each other.

10. A vehicular device for spreading strewable material over a striplike area of the ground during ground traversing movement of the device, said device comprising a supporting frame and at least one container for said material mounted on said frame, said container having an outlet opening, a supporting member mounted on said frame beneath said opening, and a shaking device coupled to said supporting member for oscillating the same, and a spreading device supported by said frame beneath said supporting member for receiving material from the latter and spreading the material over a striplike area.

11. A vehicular device for spreading strewable material over a striplike area of the ground during ground traversing movement of the device, said device comprising a supporting frame, at least one container for said material mounted on said frame and including at least two portions separated at least partly from each other and each having an outlet opening, and a spreading device beneath each of said outlet openings, said outlet openings being located at different sides of the longitudinal axis of the device at the outer sides of the container extending in a direction transversely of the travelling direction of the device.

12. A device as defined in claim 11 wherein the container portions include bottoms inclined towards said outlet openings.

13. A device as defined in claim 11 comprising and wherein the device is supported by two running wheels on different sides of the longitudinal axis of the device, the outlet openings being located adjacent said running wheels.

References Cited in the file of this patent

UNITED STATES PATENTS

| | | |
|---|---|---|
| 687,399 | Goodwin | Nov. 26, 1901 |
| 1,021,544 | Meronek | Mar. 26, 1912 |
| 1,601,039 | Pereda | Sept. 28, 1926 |

FOREIGN PATENTS

| | | |
|---|---|---|
| 4,942 of 1905 | Great Britain | Nov. 9, 1905 |